United States Patent
Merrow et al.

(10) Patent No.: US 10,536,582 B2
(45) Date of Patent: Jan. 14, 2020

(54) SYSTEMS AND METHODS FOR PRODUCING BUILD CALLS

(71) Applicant: Eliza Corporation, Beverly, MA (US)

(72) Inventors: Lucas Merrow, York, ME (US); Alexandra Drane, Winchester, MA (US); Ivy Krull, Andover, MA (US)

(73) Assignee: ELIZA CORPORATION, Danvers, MA (US)

( * ) Notice: Subject to any disclaimer, the term of this patent is extended or adjusted under 35 U.S.C. 154(b) by 0 days.

(21) Appl. No.: 15/840,865

(22) Filed: Dec. 13, 2017

(65) Prior Publication Data

US 2018/0103152 A1    Apr. 12, 2018

Related U.S. Application Data

(63) Continuation of application No. 12/022,723, filed on Jan. 30, 2008.
(Continued)

(51) Int. Cl.
*H04M 1/64* (2006.01)
*H04M 11/10* (2006.01)
(Continued)

(52) U.S. Cl.
CPC ......... *H04M 11/10* (2013.01); *H04M 3/5158* (2013.01); *H04M 3/46* (2013.01);
(Continued)

(58) Field of Classification Search
CPC ......... H04M 2201/39; H04M 2201/40; H04M 2201/60; H04M 3/4931; H04M 3/5158; H04M 3/5183
(Continued)

(56) References Cited

U.S. PATENT DOCUMENTS 5,664,003 A * 9/1997 Foladare ............... H04W 76/10
                                                                 455/459
6,226,360 B1    5/2001 Goldberg et al.
(Continued)

FOREIGN PATENT DOCUMENTS

JP    2000049974    12/2001
JP    2001358846    12/2001
(Continued)

OTHER PUBLICATIONS

Supplementary European Search Report dated Nov. 1, 2011 from Corresponding European Patent Application No. 08714131.3.
(Continued)

*Primary Examiner* — Solomon G Bezuayehu
(74) *Attorney, Agent, or Firm* — Perkins Coie LLP

(57) ABSTRACT

Techniques are disclosed for making an automated telephone call more interactive and intelligent by saving responses gathered from a previous call and using that information to build more personal and engaging subsequent interactions. An initial telephone call can be designed with data needs in mind. Relevant responses from the initial calls can be captured and stored and a follow-up call can be created that includes dialogs that reference specific information from the previous interactions with the system. Such build call techniques can be utilized on outbound, as well as inbound calls, and can simulate a human being's ability to listen, remember and refer to past conversations, making the automated telephone calls more interactive and effective.

31 Claims, 4 Drawing Sheets

Related U.S. Application Data

(60) Provisional application No. 60/898,351, filed on Jan. 30, 2007.

(51) Int. Cl.
*H04M 3/51* (2006.01)
*H04M 3/46* (2006.01)

(52) U.S. Cl.
CPC ...... *H04M 3/5166* (2013.01); *H04M 2201/36* (2013.01); *H04M 2201/40* (2013.01); *H04M 2203/2011* (2013.01)

(58) Field of Classification Search
USPC .......................................... 379/88.01–88.19
See application file for complete search history.

(56) References Cited

U.S. PATENT DOCUMENTS

| | | | |
|---|---|---|---|
| 6,567,504 B1 | 5/2003 | Kercheval et al. | |
| 2003/0001727 A1 | 1/2003 | Steinmark | |
| 2003/0187655 A1* | 10/2003 | Dunsmuir | H04M 3/53333 704/270 |
| 2003/0212575 A1* | 11/2003 | Saalsaa | G06Q 10/10 705/2 |
| 2004/0234065 A1* | 11/2004 | Anderson | H04M 3/5158 379/266.07 |
| 2005/0070245 A1* | 3/2005 | Nath | G08B 21/06 455/345 |
| 2005/0201533 A1 | 9/2005 | Emam et al. | |
| 2006/0154642 A1 | 6/2006 | Scannell | |
| 2007/0016474 A1 | 1/2007 | Kannan | |
| 2007/0167153 A1* | 7/2007 | Cho | H04M 1/56 455/414.1 |
| 2008/0159503 A1* | 7/2008 | Helbling | H04M 3/565 379/142.17 |
| 2008/0187121 A1* | 8/2008 | Agarwal | H04M 3/4931 379/218.01 |
| 2008/0212746 A1* | 9/2008 | Gupta | G06F 19/3418 379/38 |

FOREIGN PATENT DOCUMENTS

| | | |
|---|---|---|
| JP | 2002252725 | 9/2002 |
| JP | 20035778 | 1/2003 |
| JP | 2003169147 | 6/2003 |
| JP | 2003219038 | 7/2003 |
| JP | 200480717 | 3/2004 |
| JP | 2005062240 | 3/2005 |
| JP | 2005063077 | 3/2005 |
| JP | 2005136814 | 5/2005 |
| JP | 2006093960 | 4/2006 |
| JP | 2006229753 | 8/2006 |
| JP | 2006339810 | 8/2006 |
| JP | 2006245758 | 9/2006 |

OTHER PUBLICATIONS

Canadian Office Action from related Canadian Patent Application No. 2,675,042 dated Apr. 4, 2018 (5 pages).

\* cited by examiner

SYSTEMS AND METHODS FOR PRODUCING BUILD CALLS

RELATED APPLICATION

This application is a Continuation of and claims the benefit of U.S. patent application Ser. No. 12/022,723, filed 30 Jan. 2008, which claims the benefit of U.S. Provisional Patent Application No. 60/898,351 filed 30 Jan. 2007, the entire content of which is incorporated herein by reference.

FIELD OF THE DISCLOSURE

The present disclosure relates generally to automated telephone calling techniques and, and more particularly, to methods and systems used to capture specific responses from an initial automated telephone conversation and using that data to build or create a more personal and intelligent future interactions with the person involved with the initial telephone call.

BACKGROUND OF THE DISCLOSURE

In the new, connected economy, it has become increasingly important for companies or service providers to become more in tune with their clients and customers. Such contact can be facilitated with automated telephonic transaction systems, in which interactively-selected prompts are played in the context of a telephone transaction, and the replies of a human user are recognized by an automatic speech recognition system.

The answers given by the respondent are processed by the system in order to convert the spoken words to meaning, which can then be utilized interactively, or stored in a database. One example of such a system is described in U.S. Pat. No. 6,990,179, issued in the names of Lucas Merrow et al. on 24 Jan. 2006 and assigned to the assignee of the present application, further discussed below, the entire content of which is incorporated herein by reference.

In order for a computer system to recognize the words that are spoken and convert these words to text, the system must be programmed to phonetically break down the spoken words and convert portions of the words to their textural equivalents. Such a conversion requires an understanding of the components of speech and the formation of the spoken word. The production of speech generates a complex series of rapidly changing acoustic pressure waveforms. These waveforms comprise the basic building blocks of speech, known as phonemes.

Vowels and consonants are phonemes and have many different characteristics, depending on which components of human speech are used. The position of a phoneme in a word has a significant effect on the ultimate sound generated. A spoken word can have several meanings, depending on how it is said. Linguists have identified allophones as acoustic variants of phonemes and use them to more explicitly describe how a particular word is formed.

Automated telephone calls that use speech recognition are a cost effective method of engaging large populations; organizations use this methodology to reach out to thousands of people in a single day.

While such prior art automated telephone call techniques can be effective for their intended purposes, such techniques can present certain problems and limitations. For example, if the telephone calls are perceived by the recipient as being impersonal or context-insensitive, and thus not approximating a conversation with a live human being, the call(s) can be ineffective.

SUMMARY OF THE DISCLOSURE

The present disclosure addresses the limitations and problems noted previously for prior art automated phone call techniques by providing methods and systems for capturing specific responses from an initial automated telephone conversation and using that data to build or create a more personal and intelligent subsequent interaction with the person involved with the initial telephone call. A primary purpose of any such subsequent "build calls" includes that information conveyed or acquired during a previous or initial call or information concerning an action (or lack thereof) requested during a previous or initial call is utilized (or built upon) for a subsequent call.

An embodiment of the present disclosure includes a method of creating an engaging and intelligent series of speech-activated telephone calls, where a follow-up conversation with an individual builds upon responses gathered from a previous call that the system conducted with that person. An initial telephone call can be made or conducted to a call recipient or targeted person. Information can be gathered or received from that person during the initial call and saved for subsequent use. One or more subsequent calls can be made to the same person, with the one or more subsequent calls being built with or incorporating information received from the called person during the initial call. An automated system can be used to make the initial call and/or the subsequent call as well as for recording responses of the called person.

Another embodiment of the present disclosure includes a system configured to initiate and conduct (hold) initial and/or subsequent calls to one or more targeted people over a telephone system. For such calls, the system can produce spoken voice prompts for telephony-based informational interaction. The system can record responses given during an initial call. The information recorded by the system can be used for one or more subsequent calls, or build calls, to the same individual(s). Each subsequent call can incorporate or be based (or built) on information gathered from the called person during the previous call(s), forming a so-called "build call". The system can include an automated calling system, a storage system/medium, and a speech recognition system. For populations (e.g., large) of targeted or potential call recipients, the speech recognition system can be speaker-independent so that it does not require any voice training by the individual call recipients.

BRIEF DESCRIPTION OF THE DRAWINGS

Aspects and embodiments of the present disclosure may be more fully understood from the following description when read together with the accompanying drawings, which are to be regarded as illustrative in nature, and not as limiting. The drawings are not necessarily to scale, emphasis instead being placed on the principles of the disclosure. In the drawings.

Figure 1:
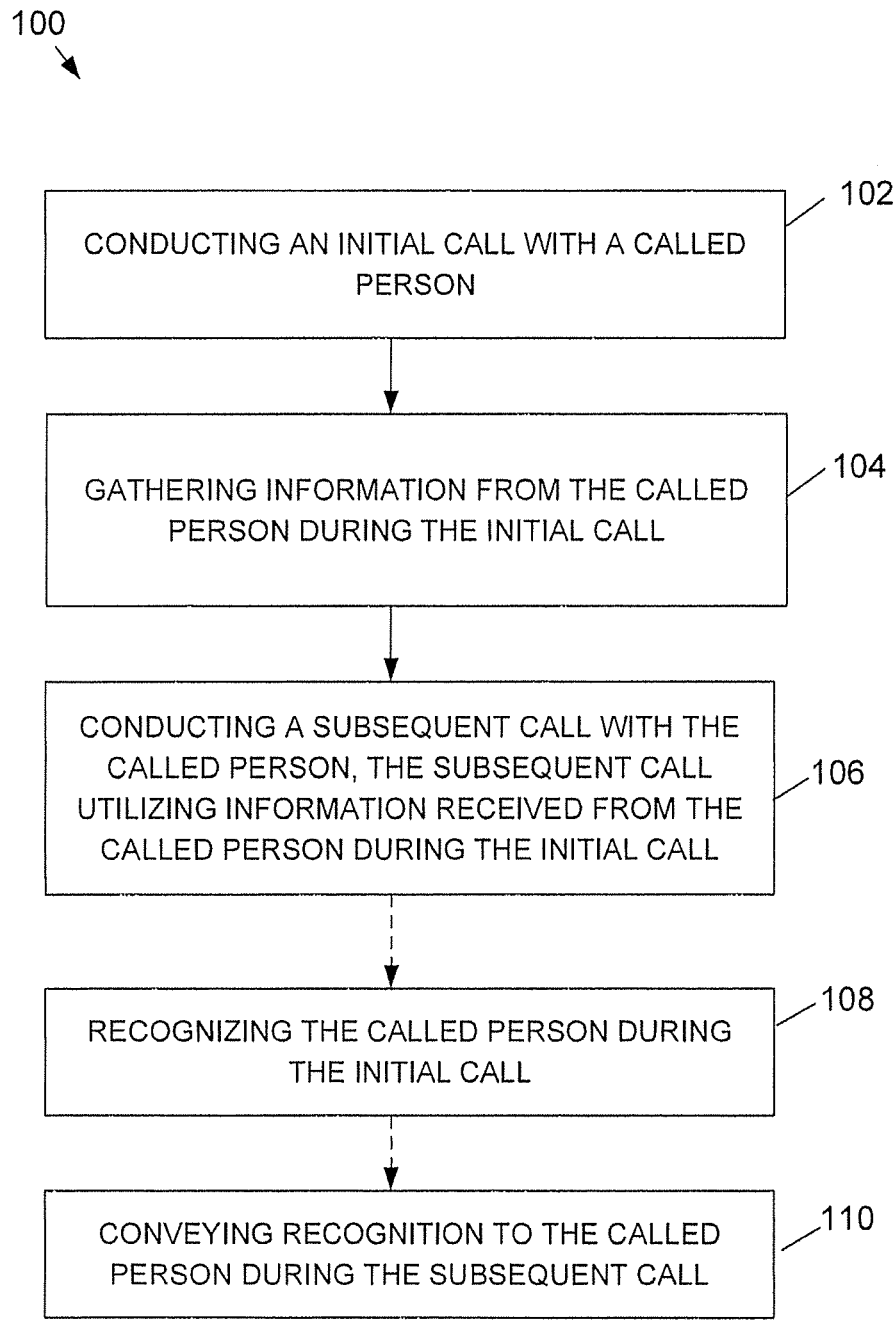
FIG. 1 depicts a flow chart according to an exemplary embodiment of the present disclosure.

While certain embodiments depicted in the drawings, one skilled in the art will appreciate that the embodiments depicted are illustrative and that variations of those shown, as well as other embodiments described herein, may be envisioned and practiced within the scope of the present disclosure.

DETAILED DESCRIPTION

Aspects and embodiments of the present disclosure are directed to techniques, including methods and systems, for creating an engaging and intelligent series of speech-activated telephone calls, where a follow-up conversation with an individual builds upon responses gathered from a previous call the system conducted with that person.

To utilize automated telephone calls to interact successfully with a broad range of people, it is desirable to be as precise and personal as possible for such communication. Embodiments of the present disclosure provide for successive automated calls that are personalized, context-sensitive, and thus life-like. A primary purpose of any such subsequent "build calls" includes that information conveyed or acquired during a previous or initial call or information concerning an action (or lack thereof) requested during a previous or initial call is utilized (or built upon) for a subsequent call.

As was described previously, automated telephone calls that use speech recognition are a cost effective method of engaging large populations; organizations use this methodology to reach out to thousands of people in a single day. Research has shown that automated calls can be more effective to the extent they are personalized, context-sensitive, and thus approximate a conversation with a live human being. People are more likely to engage in an automated telephone call, using speech recognition technology, if the conversation approximates an interaction between two human beings, instead of the more traditional approach to automated calls, which often involves one-way, repetitive communication from the computer to the human being at the other end of the telephone line.

There are a number of ways to make an automated conversation more "real," as described herein; embodiments of the present disclosure utilize a unique approach that includes "remembering" past interactions and intelligently using that information to engage someone in a subsequent follow-up conversation. Such building on an initial conversation does not require the caller to access a record created on a past call, even if the person is calling inbound to engage in the second conversation. Rather, embodiments of the present disclosure include the ability to dynamically recognize an inbound or outbound caller and share relevant information based upon the last time the system "spoke" (e.g., interacted) with them.

Referring now to the drawings, FIG. 1 depicts a flow chart according to an exemplary embodiment of the present disclosure. An initial telephone call can be designed and conducted to engage individuals, as described at 102. Information or data can be gathered from the individual during the initial call, as described at 104. One or more subsequent calls can be designed for the called person, with the subsequent call(s) building upon and utilizing information from the previous conversation of the initial call, as described at 106. The subsequent calls can be inbound or outbound calls, i.e., the initially called person can make or receive the subsequent build call(s).

During (or subsequent to) the initial conversation, each called person can be recognized, as described at 108. During the subsequent call(s), the called person (e.g., caller) can be recognized and that recognition can be conveyed to the caller, as described at 110. In such a way, the called person can be engaged in a personal and intelligent conversation based upon past interactions with that person (and his/her responses).

Figure 2:
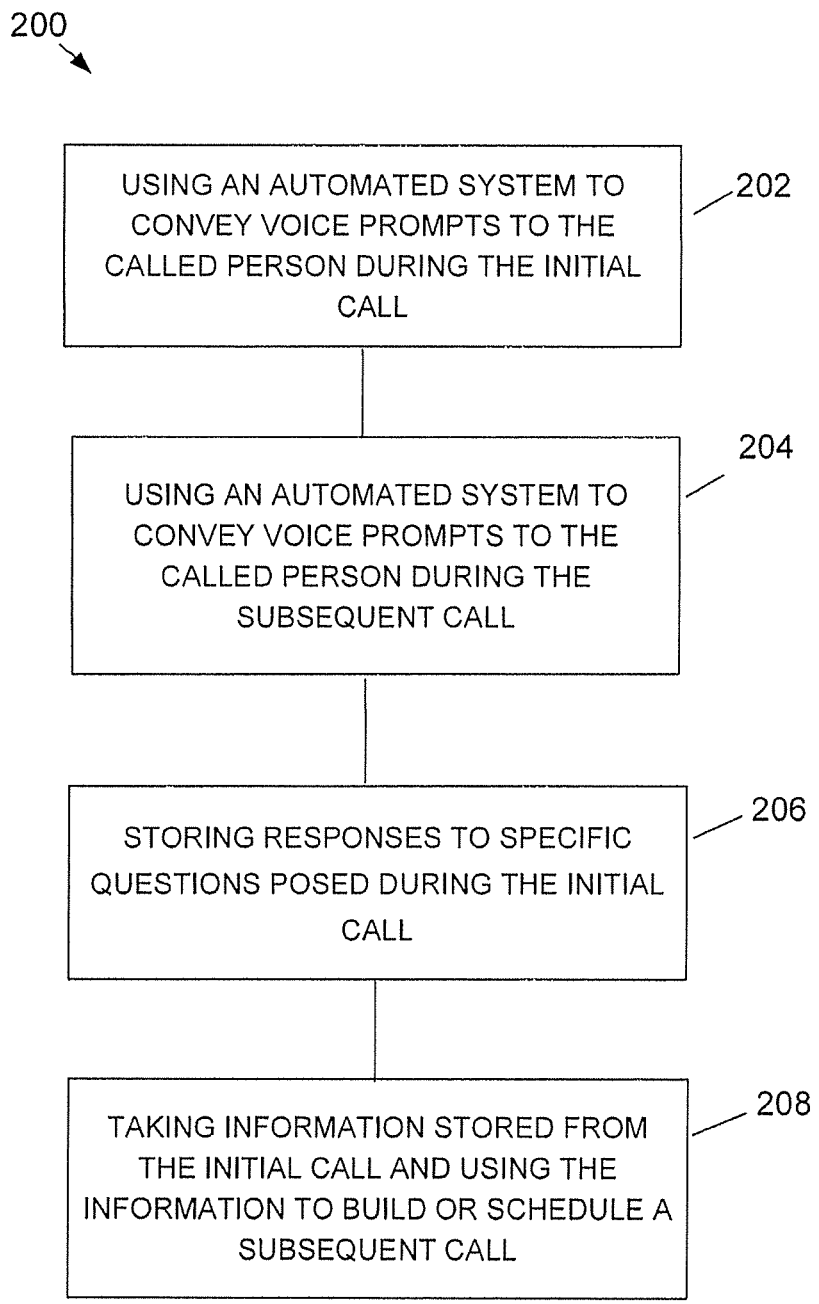
FIG. 2 depicts a flow chart according to an exemplary embodiment of the present disclosure.

FIG. 2 depicts a flow chart according to an exemplary embodiment of the present disclosure. An automated system can be used to convey voice prompts to the called person during an initial call, as described at 202. Similarly, an automated system can be used to convey voice prompts to the called person during one or more subsequent calls (inbound or outbound), as described at 204.

Continuing with the description of method 200, responses to specific questions posed during the initial call can be stored and/or processed, e.g., by a voice recognition system, as described at 206. Information and/or data from the initial call can be taken and used to build or schedule a subsequent call, as described at 208.

Figure 3:
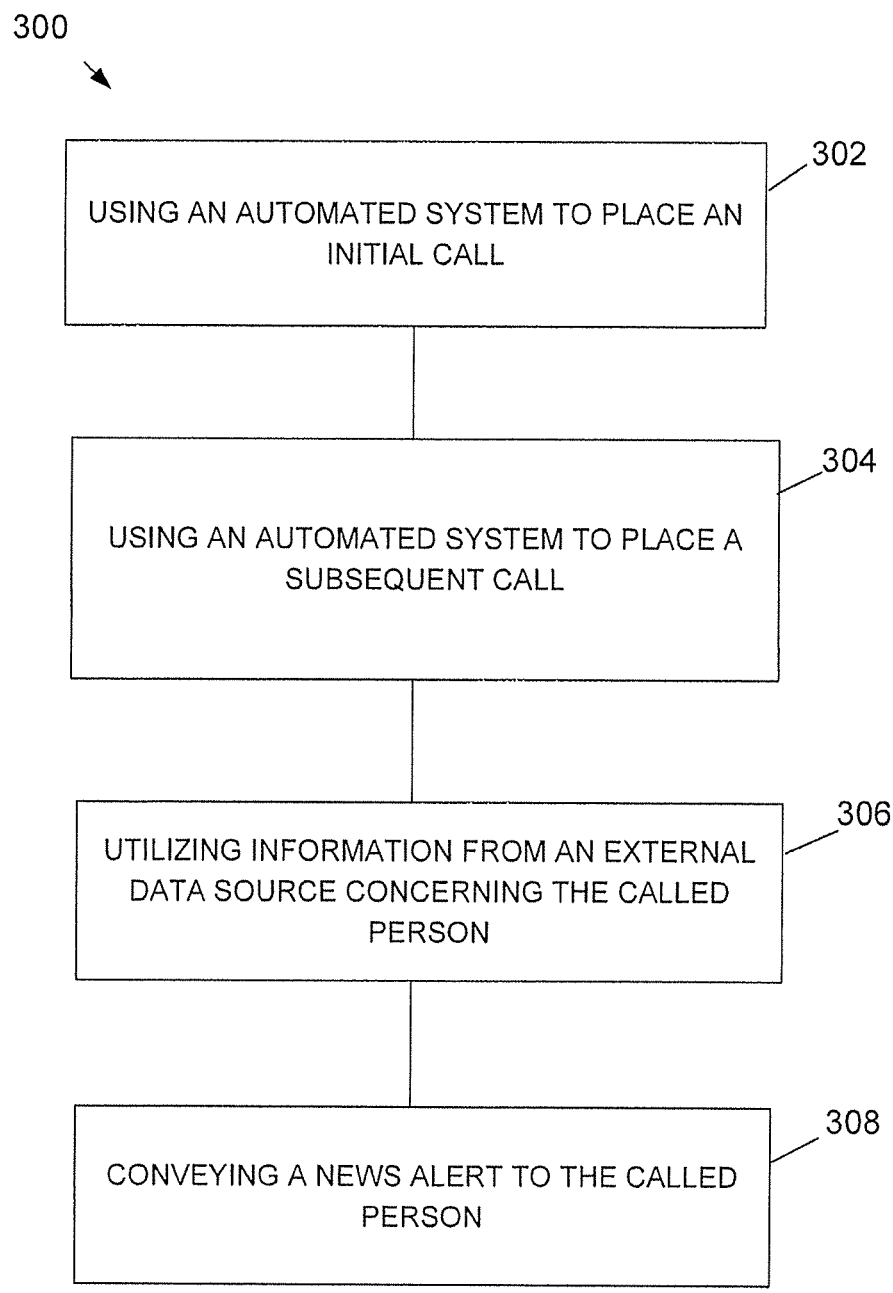
FIG. 3 depicts further method portions in accordance with exemplary embodiments of the present disclosure.

FIG. 3 depicts further method portions in accordance with exemplary embodiments of the present disclosure. An automated system, e.g., as described for FIG. 4, may be used to place an initial call to a called/targeted person, as described at 302. Similarly, an automated system may be used to place one or more subsequent calls to the called/targeted person, as described at 304.

Continuing with the description of 300, information about the called/targeted person from an external data source (relative to the initial call) can be used for one or more subsequent calls to that person, as described at 306. The external data or information can be used in conjunction with the information/data gathered during the initial call. Moreover, news alerts and/or other information may be conveyed to the called person during a subsequent call, as described at 308. In exemplary embodiments, and without limitation, the external data source can include insurance claim data, census demographic data, consumer purchase data, community service information, police alerts, commuter system information, and the like.

The following example is provided for further understanding of the methods and systems of the present disclosure.

Example: A Follow-Up Conversation from a Car Dealership:

In our last conversation, we spoke about the importance of routine maintenance for your car, most of which is covered under the warranty you presently have on your automobile.

NOTE: A caller at the targeted telephone number said no to having arranged an oil change when queried in previous call.

Specifically, we talked about the importance of having your oil changed every 5,000 miles. Last time we spoke, your car was due for this maintenance. Please tell me, have you had a chance to get the oil changed?

Yes—That's excellent! CONTINUE to next flagged maintenance.

No—Okay. Are you planning to get it changed?

Yes—That's excellent. Remember, having the oil changed every 5,000 miles can have a significant impact on the health of your engine. CONTINUE TO next flagged maintenance.

No—All right. Please do consider following-up with the dealership to get your oil changed since it can have a significant impact on the health of your engine. We can even have one of our technicians come to your home or work place to change the oil for you. CONTINUE TO next flagged maintenance.

NOTE: If yes to fluids in previous call, Go to electrical; if no to fluids, CONTINUE We also talked about the importance of getting your car's fluids checked every three months. Have you had a chance to get your car's fluids checked since our last conversation?

As the preceding example indicates, the follow-up call builds on a past conversation by referring to a prior call, referencing information the person shared in the earlier call, and cuing up specific questions based upon an individual's response to a question in the past, all of which approximate a live conversation between two human beings.

Figure 4:
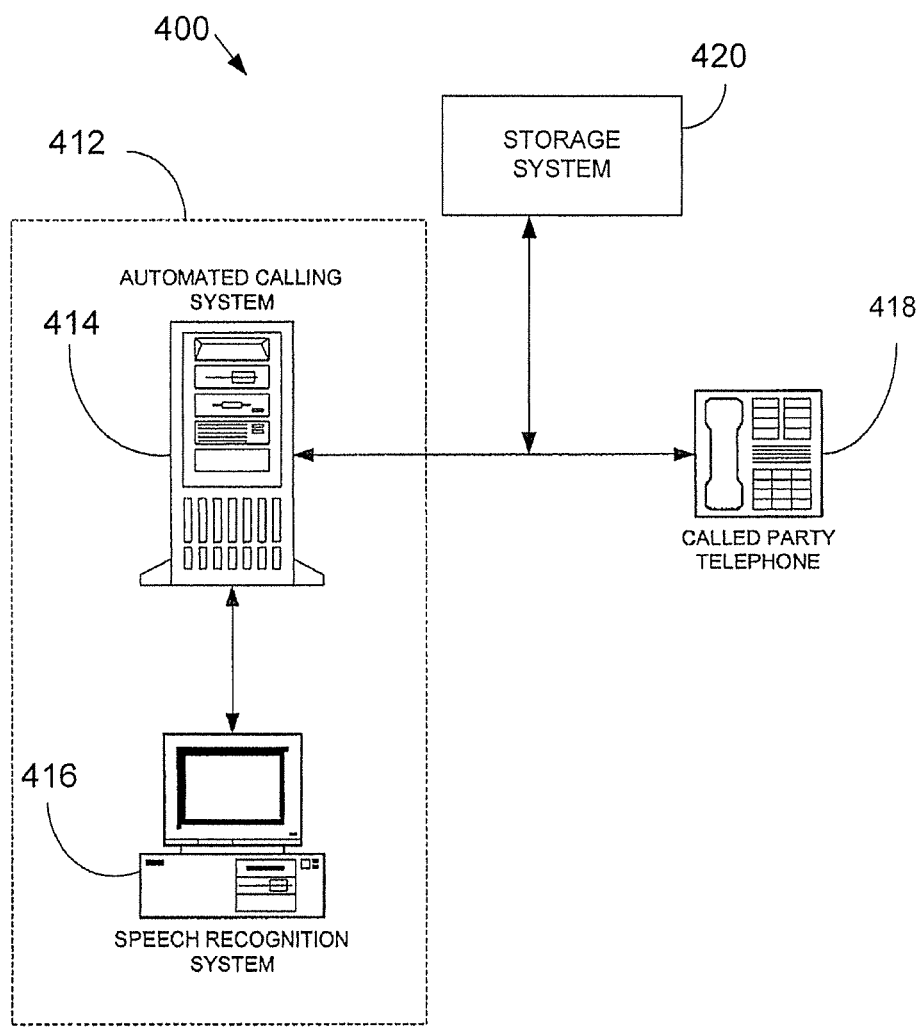
FIG. 4 depicts a diagrammatic view of a system in accordance with an exemplary embodiment of the present disclosure.

FIG. 4 depicts a diagrammatic view of a system 400 in accordance with an exemplary embodiment of the present disclosure. System 400 can be used in conjunction with methods of the present disclosure, e.g., as shown and described for FIGS. 1-3, and can include an automated subsystem 412 that includes an automated telephone calling system 414 and a speech recognition system 416. System 400 can include a called party telephone 418, and a storage system 420, as shown. Storage system 420 can include any suitable voice recording device and/or voice recording media, e.g., magnetic tape, flash memory, etc. for recording information from the called person during an initial call and/or subsequent build calls.

The automated telephone calling system 414 can be of any suitable kind, and may include a personal computer, although a main frame computer system can also (or alternatively) be used. All of the components of telephone calling system 414 can reside on a particular computer system, thus enabling the system to independently process data received from a respondent in the manner described below. Alternatively, the components of system 414 may be included in different systems that have access to each other via a LAN or similar network. For example, the automated telephone calling device 414 may reside on a server system that is configured to receive the audio response from a telephone 418 and transmit the response to the speech recognition device 416.

The automated telephone calling system 414 may also include a network interface that facilitates receipt of audio information by any of a variety of networks, such as telephone networks, cellular telephone networks, the Web, Internet, local area networks (LANs), wide area networks (WANs), private networks, virtual private networks (VPNs), intranets, extranets, wireless networks, and the like, or some combination thereof. The automated subsystem 412 may be accessible by any one or more of a variety of input devices capable of communicating audio information. Such devices may include, but are not limited to, a standard telephone or cellular telephone 418.

With continued reference to FIG. 4, automated telephone calling system 414 can include a database of persons to whom the automated subsystem 412 is capable of initiating telephone calls, a telephone number associated with each person and a recorded data file that includes the target person's name. Such automated telephone calling devices are known in the art. As is described below, the automated telephone calling system 414 is capable of initiating a telephone call to a target person and playing a prerecorded greeting prompt, asking for the target person, and/or other voice prompts and then recording responses of the called/target person. System 414 can then interact with speech recognition system 416 to analyze responses received from the person on telephone 418. The automated subsystem 412 can also respond to an inbound call from (directly or indirectly) the initially called person.

Speech recognition system 416 can function as an automated system on which a speech recognition application, including a series of acoustic outputs or voice prompts, which can comprise queries about a particular topic, are programmed so that they can be presented to a respondent, preferably by means of a telephonic interaction between the querying party and the respondent. A speech recognition application, however, may be any interactive application that collects, provides, and/or shares information, or that is capable of such. For populations (e.g., large) of targeted or potential call recipients, the speech recognition system can be speaker-independent so that it does not require any voice training by the individual call recipients.

Exemplary embodiments of systems and methods of the present disclosure can include that it isn't just healthcare or health plan information that is gathered—it could be personal information like language preference, time of day for a call, thoughts on a program, planned behavior that relates to health or other life events.

Moreover, a news alert of a subsequent call can provide community event information—examples include local health clinics, seminars, etc. In certain embodiments, a build call can be centered on or based upon the absence of a response. For example, it could be that an attempt was made to contact someone, they didn't call back in or take the action requested in the initial call (which lack action could be ascertained or known from external data); this knowledge could be utilized in the build call. External data section, it should be noted, can include publicly available data, e.g., from the Behavioral Risk Factor Surveillance System (BRFSS) of the National Center for Chronic Disease Prevention and Health Promotion (i.e., the public health data gathered through the CDC and state Public Health departments). Additionally, cultural indicator data, such as demographics linking a person to a particular culture may also be utilized.

As examples, in the present disclosure, a speech application may be any of a group of interactive applications, including consumer survey applications; Web access applications; educational applications, including computer-based learning and lesson applications and testing applications; screening applications; consumer preference monitoring applications; compliance applications, including applications that generate notifications of compliance related activities, including notifications regarding product maintenance; test result applications, including applications that provide at least one of standardized tests results, consumer product test results, and maintenance results; and linking applications, including applications that link two or more of the above applications.

Exemplary voice/speech recognition techniques that can be implemented within the scope of the present disclosure are described in U.S. patent application Ser. No. 11/219,593 filed 2 Sep. 2005, entitled "Speech Recognition Method and System for Determining the Status of an Answered Telephone During the Course of an Outbound Telephone Call," which is a continuation of U.S. patent application Ser. No. 09/945,282 filed 31 Aug. 2001, entitled "Speech Recognition Method and System for Determining the Status of an Answered Telephone During the Course of an Outbound Telephone Call," now U.S. Pat. No. 6,990,179 (referenced above); the entire contents of all of which are incorporated herein by reference. It should be understood that such systems (or techniques) can further include an inbound calling features with interaction between the caller and the speech recognition system.

Embodiments according to the present disclosure may also be used with or implement specifically constructed voice prompts having specifically constructed speech parameters, such as those disclosed in U.S. patent application Ser. No. 12/020,217 filed 25 Jan. 2008, entitled "Systems and Techniques for Producing Spoken Voice Prompts," assigned to the assignee of the subject disclosure; the entire content of which is incorporated herein by reference.

Accordingly, embodiments of the present disclosure can provide advantages relative to prior art automated phone techniques, as described herein. Embodiments can be utilized to build more personal and engaging subsequent interactions, can be utilized on outbound, as well as inbound calls and can simulate a human being's ability to listen, remember and refer to past conversations, making the automated telephone calls more interactive and effective.

While certain embodiments have been described herein, it will be understood by one skilled in the art that the methods, systems, and apparatus of the present disclosure may be embodied in other specific forms without departing from the spirit thereof.

Accordingly, the embodiments described herein, and as claimed in the attached claims, are to be considered in all respects as illustrative of the present disclosure and not restrictive.

What is claimed is:

1. A method of producing a telephone call for telephony-based informational interaction, the method comprising:
    using an automated telephone communication system to send computer-generated voice prompts as part of conducting an initial call with a called person;
    receiving and storing at the automated telephone communication system information from the called person during the initial call; and
    using an automated telephone communication system to send additional voice prompts to the called person as part of conducting at least one subsequent call with the called person, the at least one subsequent call utilizing information from the called person from the initial call and any other previous call, wherein the initial call or any other previous call includes a requested call back or a requested action from the called person and the one or more of the additional voice prompts in the at least one subsequent call is built based upon an absence of a response to the requested call back or the requested action from the called person during the initial call or any other previous call.

2. The method of claim 1, wherein conducting the initial call comprises recognizing the called person during the initial call.

3. The method of claim 1, wherein storing the information received from the called person during the initial call comprises storing responses to specific questions posed during the initial call.

4. The method of claim 1, wherein conducting the at least one subsequent call comprises recognizing the called person.

5. The method of claim 4, wherein recognizing the called person comprises conveying recognition to the called person in the at least one subsequent call.

6. The method of claim 1, wherein the information that is received from the called person comprises healthcare information.

7. The method of claim 1, wherein the information that is received from the called person comprises health plan information.

8. The method of claim 1, further comprising utilizing information from an external data source outside of the initial call to the called person for conducting the at least one subsequent call.

9. The method of claim 8, wherein the external data source comprises insurance claim data.

10. The method of claim 8, wherein the external data source comprises census demographic data.

11. The method of claim 8, wherein the external data source comprises consumer purchase data.

12. The method of claim 1, further comprising conveying a news alert to the called person during the at least one subsequent call.

13. The method of claim 12, wherein the news alert comprises a public safety message.

14. The method of claim 12, wherein the news alert comprises a weather report.

15. The method of claim 1, wherein the at least one subsequent call includes healthcare information.

16. The method of claim 1, wherein the at least one subsequent call includes health plan information.

17. The method of claim 1, wherein information received from the called person comprises a language preference, a time of day for a call, thoughts on a program, a planned behavior that relates to health, or information related to a life event.

18. The method of claim 12, wherein the news alert comprises community event information.

19. The method of claim 18, wherein the community event information comprises information about a local health clinic or seminar.

20. The method of claim 8, wherein the external data source comprises publicly accessible data.

21. The method of claim 20, wherein the external data comprises information from Behavioral Risk Factor Surveillance System (BRFSS) of National Center for Chronic Disease Prevention and Health Promotion.

22. The method of claim 20, wherein the publicly accessible data comprises cultural indicator data.

23. A system for conducting build calls to a target person, the system comprising:
    an automated calling system including a processor and a non-transitory computer-readable media including programmed instructions stored therein, the automated calling system coupled to a communication channel and configured to place an automated initial call including one or more voice prompts to the target person at a called party telephone and to conduct one or more subsequent build calls to the target person including one or more additional automated voice prompts; and
    a storage system coupled to the automated calling system and configured to receive information associated with responses received from the target person during the automated initial call and the one or more subsequent build calls, and to record the information associated with the responses of the target person, wherein the initial call or any other previous call includes a requested call back or a requested action from the called person and the one or more additional automated voice prompts in the one or more subsequent build calls is built based upon an absence of a response to the requested call back or the requested action from the target person during the initial call.

24. The system of claim 23, further comprising an automated speech recognition system coupled to the automated calling system and configured to process auditory responses of the target person as made in response to the one or more voice prompts.

25. The system of claim 23, wherein the one or more build calls incorporate information related to a response from the target person during the initial call.

26. The system of claim 23, wherein the one or more build calls incorporate information from an external data source external to the initial call.

27. The system of claim 26, wherein the external data source comprises insurance claim data.

28. The system of claim 26, wherein the external data source comprises census demographic data.

29. The system of claim 26, wherein the external data source comprises consumer purchase data.

30. The system of claim 23, wherein the system is configured to dynamically recognize an inbound or outbound call conducted with the target person.

31. The system of claim 23, wherein the requested call back is a call to a particular phone number.

* * * * *